United States Patent [19]
Erickson et al.

[11] Patent Number: 6,147,323
[45] Date of Patent: Nov. 14, 2000

[54] PASSIVE LASER ENCLOSURE

[75] Inventors: Michael J. Erickson, Fenton; Tom Dawson, Fair Haven; Aaron Mullins, Sterling Heights, all of Mich.

[73] Assignee: FANUC Robotics North America, Inc., Rochester Hills, Mich.

[21] Appl. No.: 09/369,104

[22] Filed: Aug. 5, 1999

[51] Int. Cl.[7] .................................................. B23K 26/12
[52] U.S. Cl. ............................... 219/121.86; 219/121.82; 219/121.83
[58] Field of Search ........................... 219/121.86, 121.85, 219/121.6, 121.82, 121.83, 121.63

[56] References Cited

U.S. PATENT DOCUMENTS

| | | | |
|---|---|---|---|
| 3,775,586 | 11/1973 | Flint et al. ............................... | 219/121 |
| 3,803,379 | 4/1974 | McRay ..................................... | 219/121 |
| 3,953,706 | 4/1976 | Harris et al. ........................... | 219/121 L |
| 4,000,426 | 12/1976 | Zaitseva et al. ........................ | 250/453 |
| 4,205,216 | 5/1980 | Douglas .................................. | 219/121 |
| 4,491,717 | 1/1985 | Geffroy et al. .................. | 219/121 LG |
| 4,659,902 | 4/1987 | Swensrud et al. ...................... | 219/121 |
| 4,730,113 | 3/1988 | Edwards et al. ........................ | 250/347 |
| 4,968,206 | 11/1990 | Trillwood ................................ | 414/217 |
| 5,062,758 | 11/1991 | Trillwood ................................ | 414/217 |
| 5,274,212 | 12/1993 | Campbell et al. .................. | 219/121.86 |
| 5,464,963 | 11/1995 | Hostler et al. ...................... | 219/121.82 |
| 5,643,477 | 7/1997 | Gullo et al. ........................ | 219/121.86 |
| 5,658,476 | 8/1997 | Gullo et al. ........................ | 219/121.86 |

*Primary Examiner*—Patrick Ryan
*Assistant Examiner*—M. Alexandra Elve
*Attorney, Agent, or Firm*—Howard & Howard

[57] ABSTRACT

A laser enclosure assembly for providing a safe operating environment for an operator during the laser manipulation of a workpiece. The enclosure assembly generally includes a housing having a ceiling and a floor platform, and a pair of discs rotatably supported by the housing. The enclosure assembly further includes a partition having top and bottom ends respectively near the ceiling and the floor platform of the housing and extending between the discs to define an active chamber and a passive chamber within the housing on opposite sides of the partition. The workpiece is manipulated between the active and passive chambers to ensure the safe operating environment for the operator during the laser manipulation of the workpiece. The enclosure assembly is characterized by a pair of laser dissipation reservoirs disposed between the housing and the top and bottom ends of the partition at a predetermined circumferential position of rotation of the discs for receiving and dissipating energy generated during laser operations.

20 Claims, 4 Drawing Sheets

200
PASSIVE LASER ENCLOSURE

BACKGROUND OF THE INVENTION

1) Technical Field

The subject invention relates to a laser enclosure for utilization during laser operations conducted on a workpiece that is manipulated between a workpiece mounting chamber and an active working chamber where the laser enclosure inhibits laser energy from escaping the laser enclosure during the laser operations.

2) Description of the Prior Art

Industrial lasers are well known in the art. Particularly, industrial lasers are utilized for drilling, cutting, or welding a workpiece. Due to demands common in industry, varying strength industrial lasers are employed to effectively accomplish such operations on the workpiece. During these operations, the varying strength industrial lasers emit varying intensities of laser energy that require proper containment in order to maintain a safe operating environment for industrial laser operators.

Conventional laser enclosures are similarly well known in the art and are often implemented to satisfy the requirement of properly containing the laser energy. Such laser enclosures typically include an active working chamber where the drilling, cutting, or welding operations are performed, and a workpiece mounting chamber that is mechanically protected from the laser energy emitted in the active working chamber during operation. Due to the safe operating environment maintained by the laser enclosure, the operator is free to mount the workpiece to the laser enclosure in the workpiece mounting chamber. It is recognized that such conventional laser enclosures generally inhibit laser energy from directly or indirectly escaping from the active working chamber to the workpiece mounting chamber of the laser enclosure during laser operations. As appreciated, this effect is known in the art as establishing a "laser light tight" environment.

U.S. Pat. No. 5,658,476 to Gullo et al. discloses a conventional laser enclosure that inhibits laser energy from escaping the laser enclosure during laser operations on a workpiece. Specifically, the '476 patent to Gullo et al. discloses a laser enclosure comprising a housing having an inner cavity and a section having an opening through which workpiece pass into and out of the inner cavity. The laser enclosure further includes a workpiece positioner rotatable about a horizontal axis, and sealing apparatus movably coupled to the section and to the workpiece positioner. The sealing apparatus includes sealing members and slide attachment devices for movably coupling the sealing members to the section. The primary deficiency therefore, is that in order to establish the "laser light tight" environment, the laser enclosure of the '476 patent to Gullo et al. involves many moving parts. Furthermore, these moving parts require significant mechanical manipulation, interaction, and locking in order to achieve the "laser light tight" environment. Overall, these deficiencies are critical because, as a workpiece is drilled, cut, or welded, shavings or other processing debris of the workpiece are violently dislodged from the workpiece and randomly dispersed throughout the active working chamber. Significantly, these shavings or other processing debris mechanically disrupt the many moving parts as required by the prior art and prevent the establishment of the "laser light tight" environment.

Due to the inefficiencies identified in such conventional laser enclosures, it is desirable to implement a laser enclosure that reduces the quantity of mechanically interacting and locking parts required to establish a "laser light tight" environment thereby developing a laser enclosure that is not susceptible to randomly dispersed processing debris that negatively impact the performance of the prior art laser enclosures.

SUMMARY OF THE INVENTION AND ADVANTAGES

An enclosure assembly for providing a safe operating environment during the manipulation of a workpiece. The enclosure assembly comprises a housing that rotatably supports first and second discs. The first and second discs are disposed in a parallel and in a spaced relationship to one another. The enclosure assembly further includes a partition having opposite distal ends where the partition extends between the first and second discs. The partition also extends diametrically of the first and second discs between the opposite distal ends to define an active chamber and a passive chamber within the housing on opposite sides of the partition. The enclosure assembly is characterized by at least one laser dissipation reservoir disposed between the opposite distal ends of the partition and the housing at a predetermined circumferential position of rotation of the discs for receiving and dissipating energy generated during laser operations.

Accordingly, the subject invention provides a laser enclosure that establishes a "laser light tight" environment with at least one laser dissipation reservoir disposed between the opposite distal ends of the partition and the housing at a predetermined circumferential position of rotation of the first and second discs. The laser dissipation reservoir, therefore, elimination the quantity of mechanically interacting and locking parts required to establish the "laser light tight" environment.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
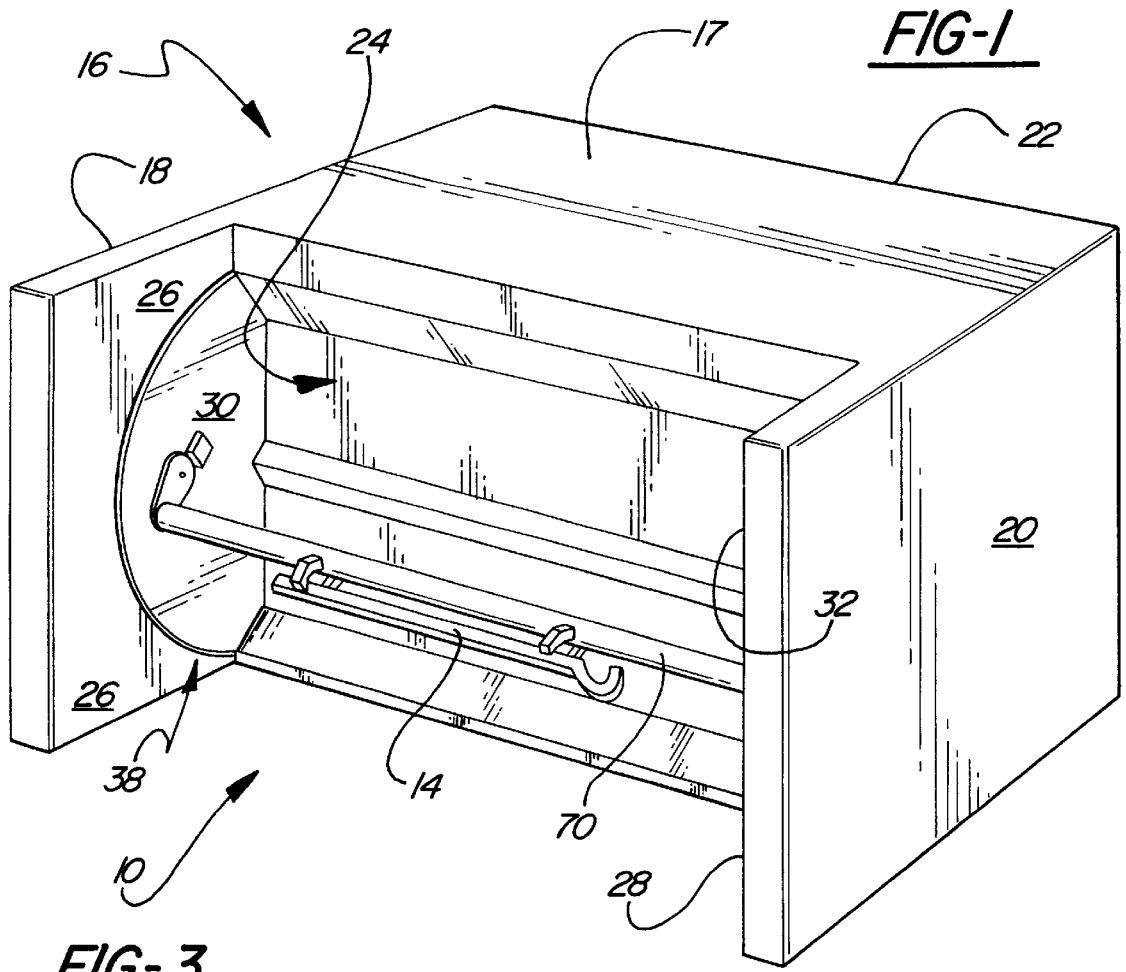
FIG. 1 is an overall perspective view of an enclosure assembly.
Figure 2:
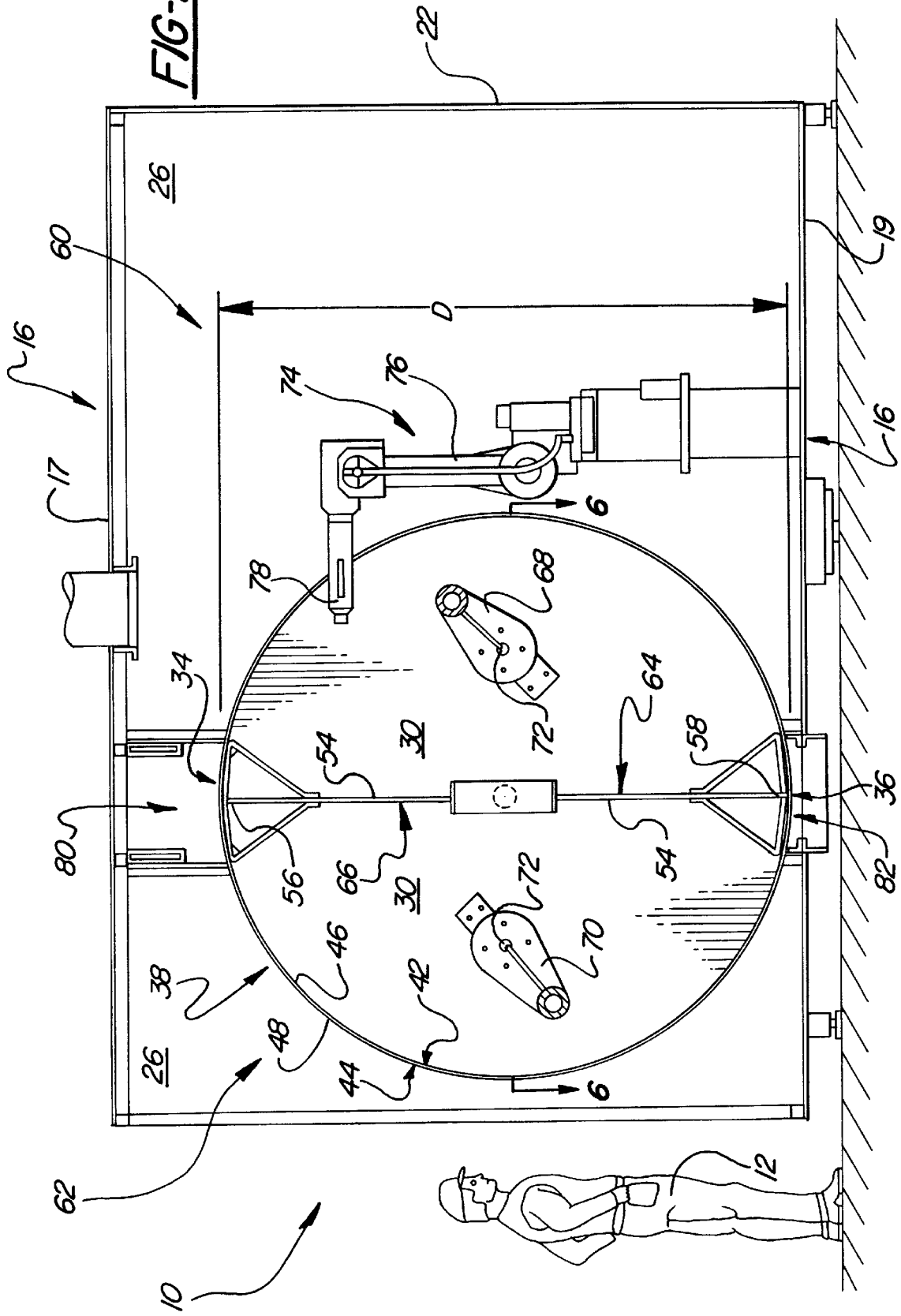
FIG. 2 is a partially cross-sectional view of the enclosure assembly in FIG. 1.

Referring to the Figures, wherein like numerals indicate like or corresponding parts throughout the several views, an enclosure assembly is generally shown at 10 in FIGS. 1 and 2. By inhibiting laser energy from exiting the enclosure assembly 10, the enclosure assembly 10 provides a safe operating environment for an operator 12 during the manipulation of a workpiece 14. The workpiece 14 may include automotive exhaust piping, automotive frame members, or any other workpiece 14 or group of workpieces 14 that may require drilling, cutting, or welding. As relevant to the subject invention, the enclosure assembly 10 is implemented during laser manipulation of the workpiece 14. When implemented in this industrial situation, the enclosure assembly 10 effectively inhibits laser energy from exiting the enclosure assembly 10. However, as appreciated, the enclosure assembly 10 may be utilized for other non-laser applications that similarly require protection to inhibit other forms of energy from exiting the enclosure assembly 10 and harming the operator 12.

Referring to both FIGS. 1 and 2, the enclosure assembly 10 includes a housing generally shown at 16. The housing 16 includes a first side wall 18, a second side wall 20, and a rear wall 22. The housing 16 further includes a ceiling 17 and a floor platform 19 extending between the first 18 and second 20 side walls, and between the rear wall 22 and a front region 24 of the enclosure assembly 10. The first side wall 18 includes a first interior compartmental wall 26, and the second side wall 20 includes a second interior compartmental wall 28. The second interior compartmental wall 28 is not shown in the overall perspective view of FIG. 1 or in the partially cross-sectional view of FIG. 2.

The enclosure assembly 10 further includes first 30 and second 32 discs rotatably supported by the housing 16. More specifically, the first disc 30 is supported by the first interior compartmental wall 26 of the housing 16, and the second disc 32 is supported by the second interior compartmental wall 28 of the housing 16. Similar to the second interior compartmental wall 28, the second disc 32 is not shown in the overall perspective view of FIG. 1. In the preferred embodiment, the first 30 and second 32 discs are disposed in a parallel and in a spaced relationship to one another, and share a common diameter D. With reference to FIG. 2, for description purposes, the common diameter D of the first 30 and second 32 discs extends vertically between a top 34 and a bottom 36 of the first 30 and second 32 discs when the discs 30, 32 are in a static position. Also for description purposes, continued reference to the static position will be used herein below to describe the orientation of the preferred embodiment in an operational position where the enclosure assembly 10 effectively inhibits laser energy from exiting. That is, in the static position, the first 30 and second 32 discs are not rotating, and the common diameter D of the first 30 and second 32 discs as shown in FIG. 2 is vertical relative to the ceiling 17 and the floor platform 19 of the enclosure assembly 10. However, as appreciated, and as described herein below, the first 30 and second 32 discs are rotatable within the first 26 and second 28 interior compartmental walls.

Figure 7:
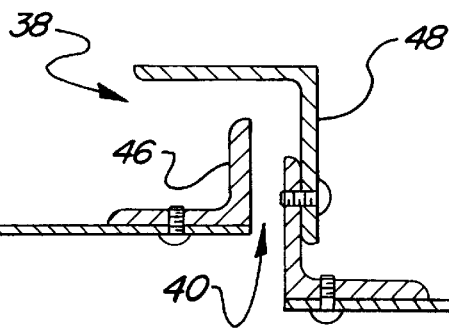
FIG. 7 is an expanded view of the deflection mechanism in FIG. 6 showing, in particular, the relationship between an operational ring and a compartmental ring.
Figure 6:
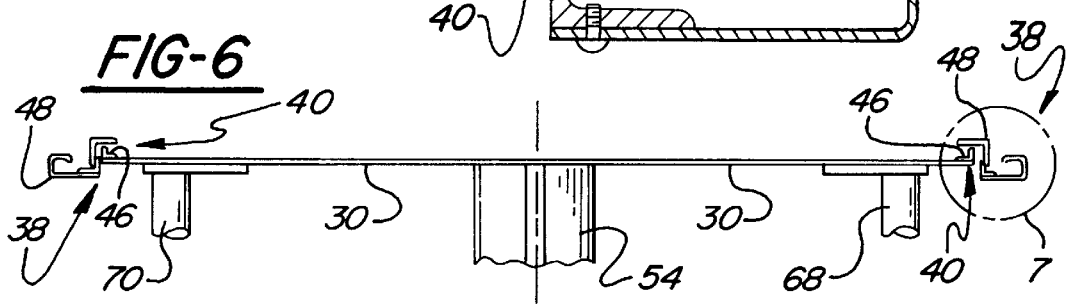
FIG. 6 is a view taken along line 6—6 in FIG. 2 showing, in particular, the deflection mechanism.

Referring now to FIGS. 2, 6 and 7, the enclosure assembly 10 further includes a deflection mechanism 38 operating between the first 26 and second 28 interior compartmental walls of the housing 16 and the first 30 and second 32 discs, respectively. Since, as described herein below, it is pertinent for the first 30 and second 32 discs to rotate in order to efficiently manipulate the workpiece 14, a rotational gap 40 is required between the first disc 30 and the first interior compartmental wall 26 and between the second disc 32 and the second interior compartmental wall 28. The deflection mechanism 38 receives and effectively inhibits laser energy from directly exiting the enclosure assembly 10 through the rotational gap 40 during laser operations. Although FIG. 2 only cross-sectionally represents the deflection mechanism 38 associated with the first disc 30, a complimentary deflection mechanism is also associated with the second disc 32. Therefore, with reference to both the first disc 30 and the second disc 32, the deflection mechanism 38 more specifically includes a plurality of operational rings 42 and a plurality of compartmental rings 44. As shown in FIG. 2, with exclusive reference to the first disc 30, a first operational ring 46 circumferentially encircles the first disc 30, and a first compartmental ring 48 is fixably disposed in the first interior compartmental wall 26 of the housing 16. Similarly, although not shown, a second operational ring circumferentially encircles the second disc 32, and a second compartmental ring is fixably disposed in the second interior compartmental wall 28 of the housing 16. At all times, the plurality of operational rings 42 and the plurality of compartmental rings 44 maintain a geometrically consistent relationship and operate in conjunction to effectively seal the enclosure assembly 10 at both the first 26 and second 28 interior compartmental walls which rotatably house the first 30 and second 32 discs.

Referring back primarily to FIGS. 1 and 2, the enclosure assembly 10 further includes a partition 54 having opposite distal ends 56,58. As best shown in FIG. 2, the opposite distal ends 56,58 of the partition 54 include an upper distal end 56 and a lower distal end 58 where the upper distal end 56 of the partition. 54 is arranged at the top 34 of the first 30 and second 32 discs when the discs 30,32 and the partition 54 are in the static position, and the lower distal end 58 of the partition 54 is arranged at the bottom 36 of the first 30 and second 32 discs when the discs 30,32 and the partition 54 are in the static position. The partition 54 extends transversely between the first 30 and second 32 discs. As appreciated, the partition 54 i& mechanically sealed to each disc 30,32 to prevent laser energy from exiting the enclosure assembly 10 during laser operations. With respect to the static position referenced above, since the partition 54 is mechanically sealed to both the first 30 and second 32 discs, the partition 54, like the first 30 and second 32 discs, is non-rotating when in the static position. Furthermore, in the static position, the partition 54 is parallel to the common diameter D of the first 30 and second 32 discs, and therefore, the partition 54 is also vertical relative to the ceiling 17 and the floor platform 19 of the enclosure assembly 10. The partition 54 also extends diametrically relative to the first 30 and second 32 discs between the opposite distal ends 56,58 of the partition 54. That is, in the static position, the upper distal end 56 of the partition 54 is at the top 34 of the first 30 and second 32 discs and the lower distal end 58 of the partition 54 is at the bottom 36 of the first 30 and second 32 discs, and the partition 54 extends vertically the entire common diameter D of the discs 30,32. As a result, the partition 54 generally defines an active chamber 60 and a passive chamber 62 within the housing 16 on opposite sides 64,66 of the partition 54. As identified above, the ceiling 17 and the floor platform 19 of the housing 16 each extend across the active chamber 60 and the passive chamber 62. Similarly, the first 26 and second 28 interior compartmental walls each extend across the active chamber 60 and the passive chamber 62. The active 60 and passive 62 chambers are further discussed herein below.

The enclosure assembly 10 further includes at least one workpiece mounting device 68 disposed between the first 30 and second 32 discs. In the preferred embodiment, as shown in FIG. 2, the enclosure assembly 10 includes a first 68 and second 70 workpiece mounting device disposed between the first 30 and second 32 discs. The first 68 and second 70 workpiece mounting devices extend horizontally and transversely between the first 30 and second 32 discs and are disposed on the opposite sides 64, 66 of the partition 54. Therefore, if in the static position the first workpiece mounting device 68 is positioned in the active chamber 60, then the second workpiece mounting device 70 is positioned in the passive chamber 62, and vice versa. The first 68 and second 70 workpiece mounting devices removably receive the workpiece 14 from the operator 12 who mounts the workpiece 14 to one of the workpiece mounting devices 68, 70. Furthermore, the first 68 and second 70 workpiece mounting devices each include a generally horizontal rotational axis 72 for rotatably manipulating the workpiece 14 in the active 60 and passive 62 chambers. Therefore, the generally horizontal rotational axes 72 of the first 68 and second 70 workpiece mounting devices permit strategic orientation of the workpiece 14 during the mounting and removing of the workpiece 14 by the operator 12 in the passive chamber 62, and permit strategic orientation of the workpiece 14 during drilling, cutting, or welding of the workpiece 14 in the active chamber 60.

As appreciated, the operator 12, who mounts the workpiece 14 to the workpiece mounting device 68 may be replaced by other devices suitable for mounting the workpiece 14 to the workpiece mounting device 68. For instance, although not shown in the Figures, such alternative devices may include a robot programmed to retrieve the workpiece 14 from a part retrieval bin and appropriately mount the workpiece 14 to the workpiece mounting device 68. Also as appreciated, the workpiece 14 can be a variously sized and variously designed part. As a result, the workpiece mounting devices 68, 70 are designed to accommodate for variations in the size and design of the workpiece 14.

As noted above, the active chamber 60 is the situs for the laser manipulation of the workpiece 14. As a result, the active chamber 60 generally contains an articulated device 74 for drilling, cutting, or welding the workpiece 14 when the workpiece 14 is situated in the active chamber 60. In the preferred embodiment, as shown in FIG. 2, the articulated device 74 is a robot 76 having, in particular, a laser head assembly 78 capable of drilling, cutting, or welding the workpiece 14. As appreciated, the articulated device 74 may also comprise other devices capable of drilling, cutting, or welding the workpiece 14.

In contrast to the active chamber 60, the passive chamber 62 is suitable as a safe work environment for the operator 12. In such a work environment, the operator 12 can safely mount or remove the workpiece 14 from the workpiece mounting device 70 without being endangered by laser energy exiting the enclosure assembly 10.

Although not shown in the Figures, a motor or other suitable drive device rotatably drives one of the discs 30, 32. Consequently, the partition 54 that is mechanically sealed to the discs 30, 32 and the other of the discs 30, 32 also rotate. The motor or other suitable drive device can rotate the partition 54 and the first 30 and second 32 discs throughout the range of 0–360°. However, the motor or other suitable drive device typically only rotates the partition 54 and the first 30 and second 32 discs 180° in order to manipulate the workpiece 14 between the active chamber 60 and the passive chamber 62, and vice versa. After the operator 12 mounts the workpiece 14 onto the workpiece mounting device 70 in the passive chamber 62, the motor rotates the mounted workpiece 14 into the active chamber 60 for laser operations such as drilling, cutting, or welding performed by the robot 76 and laser head assembly 78. Simultaneously, the workpiece 14 that was in the active chamber 60 where the laser operations are complete is rotated from the active chamber 60 into the passive chamber 62 where the operator 12 can remove the workpiece 14 from the workpiece mounting device (now 68 since rotated) and mount another of the workpiece 14 onto the workpiece mounting device 68 for rotation of the workpiece 14 into the active chamber 60 and subsequent laser operations.

Referring to FIG. 2, the enclosure assembly 10 is characterized by at least one laser dissipation reservoir 80 disposed between the opposite distal ends 56, 58 of the partition 54 and the housing 16 at a predetermined circumferential position of rotation of the discs 30, 32 for receiving and dissipating energy generated during laser operations. The preferred embodiment includes an upper laser dissipation reservoir 80 and a lower laser dissipation reservoir 82. More specifically, the upper laser dissipation reservoir 80 extends transversely between the first 30 and second 32 discs, and is disposed between the upper distal end 56 of the partition 54 and the housing 16 when the discs 30, 32 and the partition 54 are in the static position as shown in FIGS. 1 and 2. As will be described further herein below, the static position is equivalent to the predetermined circumferential position of rotation of the discs 30, 32. Correspondingly, the lower laser dissipation reservoir 82 extends transversely between the first 30 and second 32 discs, and is disposed between the lower distal end 58 of the partition 54 and the housing 16 when the discs 30, 32 and the partition 54 are at the predetermined circumferential position of rotation of the discs 30, 32. As a result, the upper laser dissipation reservoir 80 is positioned 180° from the lower laser dissipation reservoir 82.

Figure 3:
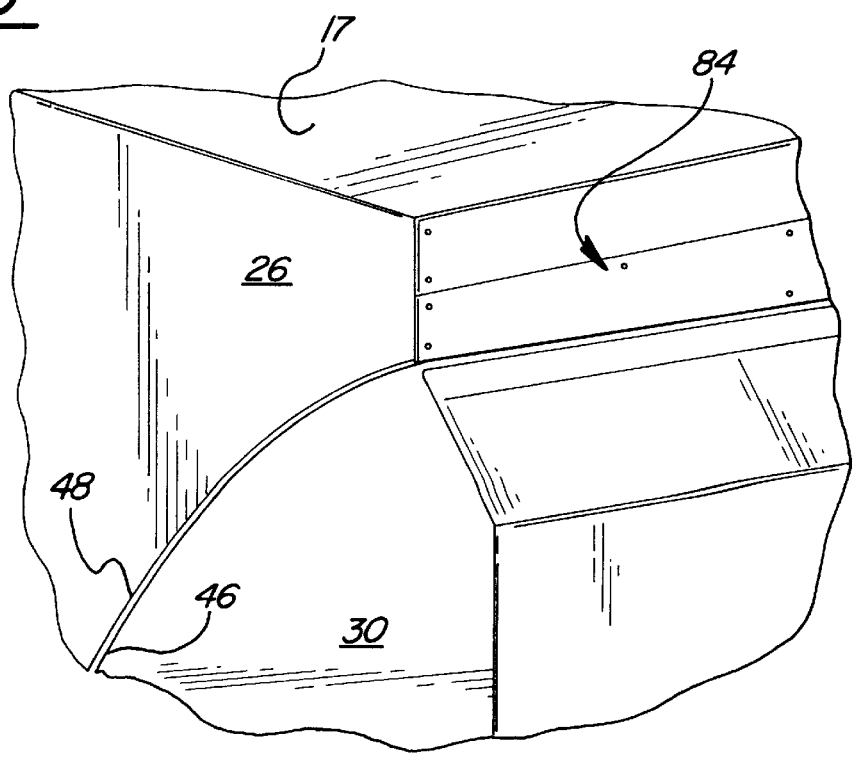
FIG. 3 is an enlarged perspective view of an upper baffle arrangement.
Figure 4:
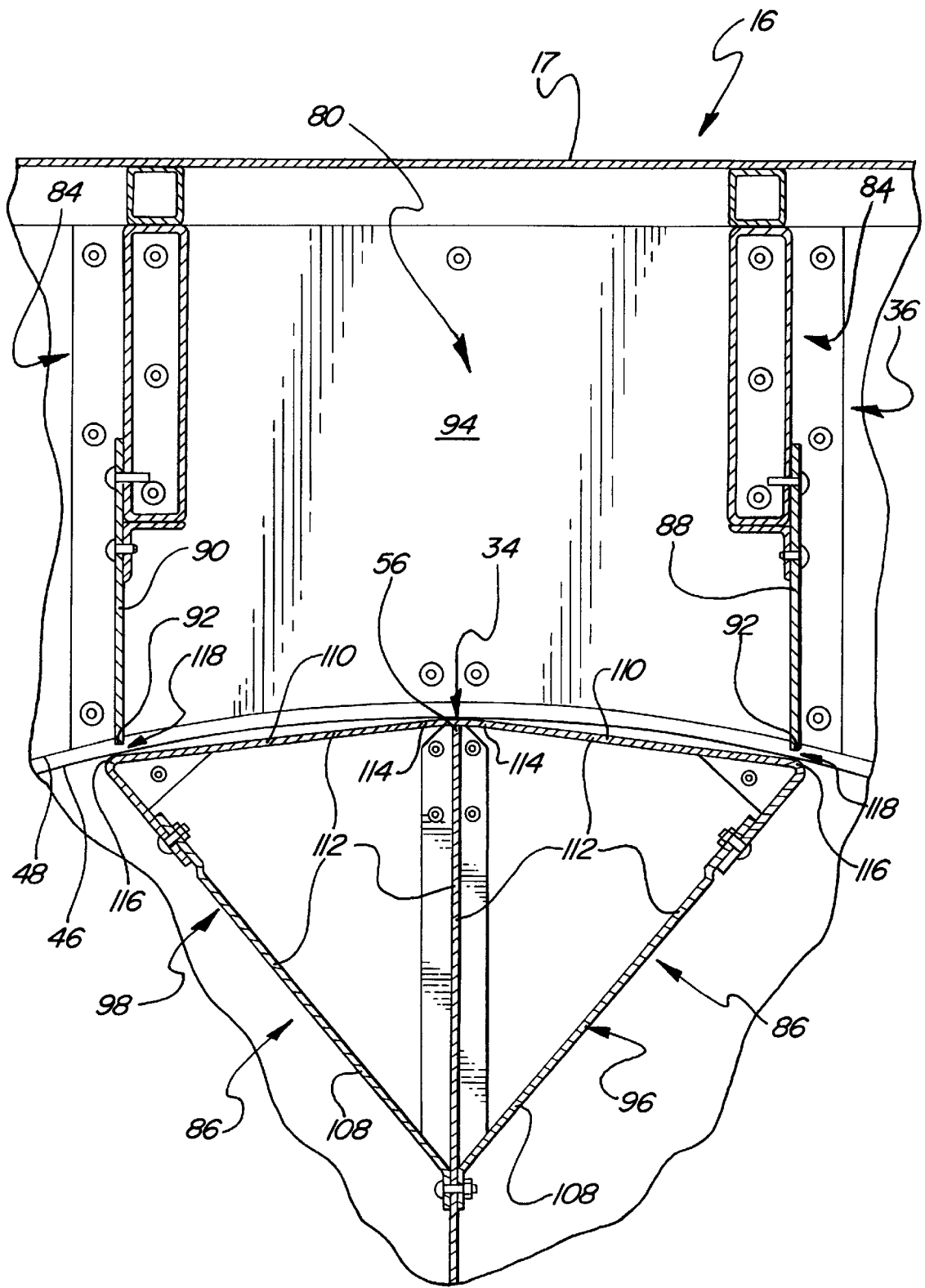
FIG. 4 is a cross-sectional view of the upper baffle arrangement showing, in particular, the relationship between the upper stationary baffles and the upper angular baffles.
Figure 5:
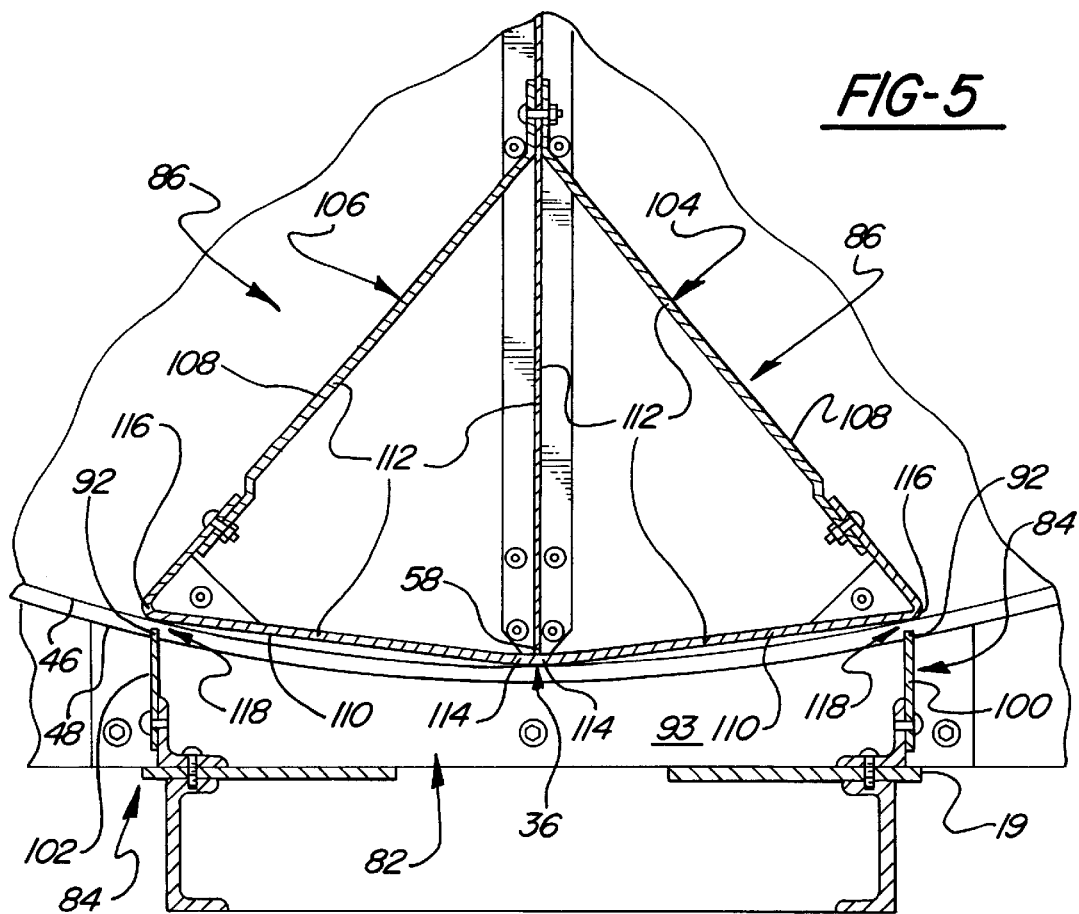
FIG. 5 is a cross-sectional view of the lower baffles arrangement showing, in particular, the relationship between the lower stationary baffles and the lower angular baffles.

Referring more specifically to FIGS. 3–5, the laser dissipation reservoirs 80, 82 include a plurality of stationary baffles 84 extending inwardly from the ceiling 17 and from the floor platform 19. Further, the laser dissipation reservoirs 80, 82 include a plurality of angular baffles 86 secured to the partition 54 and angularly extending from the partition 54 toward the stationary baffles 84 when viewed in the static position. Note that the static position, as represented in FIGS. 1 and 2, is equivalent to the predetermined circumferential position of rotation of the discs 30, 32 where the plurality of stationary baffles 84 and the plurality of angular baffles 86 are appropriately aligned to establish the upper 80 and lower 82 laser dissipation reservoirs for receiving and dissipating energy generated during laser operations. Also, similar to the mechanically sealed relationship between the partition 54 and the first 30 and second 32 discs, the angular baffles 86 are mechanically sealed to each disc 30, 32 to prevent laser energy from exiting the enclosure during laser operations. Therefore, the angular baffles 86 are also rotatable due to the rotational capability of the first 30 and second 32 discs and of the partition 54.

As pertinent to the upper laser dissipation reservoir 80, the stationary baffles 84 include first 88 and second 90 upper stationary baffles extending inwardly from the ceiling 17 to a distal end 92 and define an upper dissipation chamber 94 therebetween. When viewed in the static position, the angular baffles 86 include first 96 and second 98 upper angular baffles secured to the partition 54 approximate to the upper distal end 56 of the partition 54. The first 96 and second 98 upper angular baffles are secured approximate to the upper distal end 56 of the partition 54 for aligning the first 96 and second 98 upper angular baffles with the first 88 and second 90 upper stationary baffles when at the predetermined circumferential position of rotation of the discs 30, 32.

As pertinent to the lower laser dissipation reservoir 82, the stationary baffles 84 include first 100 and second 102 lower stationary baffles extending inwardly from the floor platform 19 to a distal end 92 and define a lower dissipation chamber 93 therebetween. When viewed in the static-position, the angular baffles 86 include first 104 and second 106 lower angular baffles secured to the partition 54 approximate to the lower distal end 58 of the partition 54. The first 104 and second 106 lower angular baffles are secured approximate to the lower distal end 58 of the partition 54 for aligning the first 104 and second 106 lower angular baffles with the first 100 and second 102 lower stationary baffles when at the predetermined circumferential position of rotation of the discs 30, 32.

In the preferred embodiment, the first 88 and second 90 upper stationary baffles are positioned 180° from the first 100 and second 102 lower stationary baffles. Similarly, the first 96 and second 98 upper angular baffles are positioned 180° from the first 104 and second 106 lower angular baffles. Furthermore, despite the rotational capability of the angular baffles 86, the first 96 and second 98 upper angular baffles always maintain the 180° position from the first 104 and second 106 lower angular baffles. Also, as appreciated, reference to the upper 96, 98 and lower 104, 106 angular baffles is only appropriate when described relative to the static position. However, since the angular baffles 86 are secured to the partition 54 and mechanically sealed to the first 30 and second 32 discs and are therefore rotatable, when the angular baffles 86 are not described relative to the static position, or even after a 180° rotation of the angular baffles 86, the first 96 and second 98 upper angular baffles may become the first 104 and second 106 lower angular baffles, and vice versa. As appreciated, after a 180° rotation of the angular baffles 86, the first 104 and second 106 lower angular baffles are now aligned with the first 88 and second 90 upper stationary baffles at the predetermined circumferential position of rotation of the discs 30, 32, and the first 96 and second 98 upper angular baffles are now aligned with the first 100 and second 102 lower stationary baffles at the predetermined circumferential position of rotation of the discs 30, 32.

As pertinent to both the upper 80 and the lower 82 laser dissipation reservoirs, the first 96 and second 98 upper angular baffles, and the first 104 and second 106 lower angular baffles each include a deflecting surface 108 and a channeling surface 110. More specifically, the deflecting surfaces 108 and the channeling surfaces 110 of the angular baffles 86 generally establish triangular baffle formations 112 in relation to the partition 54. Furthermore, the channeling surfaces 110 of the angular baffles 86 include a channeling apex 114 disposed at an intersection of the channeling surfaces ' 110 and the opposite distal ends 56, 58 of the partition 54. The channeling surfaces 110 also each include a distal end 116 intersecting the deflecting surfaces 108 wherein the distal ends 116 of the channeling surfaces 110 extend inwardly from the opposite distal ends 56, 58 of the partition 54. Finally, both the upper 80 and the lower 82 laser dissipation reservoirs include receiving junctures 118 established between the triangular baffle formations 112 of the angular baffles 86 and the plurality of stationary baffles 84 when at the predetermined circumferential position of rotation of the discs 30, 32.

Therefore, referring specifically to FIG. 4 with respect to the upper laser dissipation reservoir 80, since the channeling apexes 114 that are disposed at the intersection of the channeling surfaces 110 of the first 96 and second 98 upper angular baffles and the upper distal end 56 of the partition 54 are higher within the housing 16 relative to the distal ends 92 of the first 88 and second 90 upper stationary baffles which extend further downwardly into the housing 16, any laser energy that is generated in the active chamber 60 is prevented from directly exiting the enclosure assembly 10 where its direct intensity may still be of danger to the operator 12 working in the passive chamber 62. Instead, if such laser energy enters the receiving juncture 118 on a directly horizontal path, then the laser energy first deflects off of the channeling surface 110 at or near the channeling apexes 114 upward into the upper dissipation chamber 94 between the first 88 and second 90 upper stationary baffles where its intensity is dissipated before there is any possibility to exit the enclosure assembly 10 through the opposite receiving juncture 118 into the passive chamber 62. Or, if on the other hand, such laser energy enters the receiving juncture 118 on an upwardly angled path, then the laser energy first deflects off of the second upper stationary baffle 90 backward into the upper dissipation chamber 94 where its intensity is dissipated before there is any possibility to exit the enclosure assembly 10 through the opposite receiving juncture 118 into the passive chamber 62.

Similarly, referring specifically to FIG. 5 with respect to the lower laser dissipation reservoir 82, since the channeling apexes 114 that are disposed at the intersection of the channeling surfaces 110 of the first 104 and second 106 lower angular baffles 86 and the lower distal end 58 of the partition 54 are lower within the housing 16 relative to the distal ends 92 of the first 100 and second 102 lower stationary baffles which extend further upwardly into the housing 16, any laser energy that is generated in the active chamber 60 is prevented from directly exiting the enclosure assembly 10 where its direct intensity may still be of danger to the operator 12 working in the passive chamber 62. Instead, if such laser energy enters the receiving juncture 118 on a directly horizontal path, then the laser energy first deflects off of the channeling surface 110 at or near the channeling apexes 114 downward into the lower dissipation chamber 93 between the first 100 and second 102 lower stationary baffles where its intensity is dissipated before there is any possibility to exit the enclosure assembly 10 through the opposite receiving juncture 118 into the passive chamber 62. Or, if on the other hand, such laser energy enters the receiving juncture 118 on a downwardly angled path, then the laser energy first deflects off of the second 102 lower stationary baffle backward into the lower dissipation chamber 93 where its intensity is dissipated before there is any possibility to exit the enclosure assembly 10 through the opposite receiving juncture 118 into the passive chamber 62.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An enclosure assembly for providing a safe operating environment during the manipulation of a workpiece, said assembly comprising:

a housing;

first and second discs rotatably supported by said housing, said first and second discs being disposed in parallel and spaced relationship to one another;

a partition having opposite distal ends, said partition extending between said discs and diametrically of said discs between said opposite distal ends to define an active chamber and a passive chamber within said housing on opposite sides of said partition;

said assembly characterized by at least one laser dissipation reservoir disposed between said opposite distal ends of said partition and said housing at a predetermined circumferential position of rotation of said discs for receiving and dissipating energy generated during laser operations.

2. An assembly as set forth in claim 1 wherein said housing includes a ceiling extending across said active chamber and said passive chamber and a floor platform extending generally parallel to said ceiling and across said active chamber and said passive chamber.

3. An assembly as set forth in claim 2 wherein said housing further includes at least one interior compartmental wall extending across said active chamber and said passive chamber.

4. An assembly as set forth in claim 3 wherein said laser dissipation reservoir includes a plurality of stationary baffles extending inwardly from said ceiling and said floor platform.

5. An assembly as set forth in claim 4 wherein said laser dissipation reservoir further includes a plurality of angular baffles secured to said partition and angularly extending from said partition toward said stationary baffles.

6. An assembly as set forth in claim 5 wherein said stationary baffles include first and second upper stationary baffles extending inwardly from said ceiling to a distal end and define an upper dissipation chamber therebetween.

7. An assembly as set forth in claim 6 wherein said angular baffles include first and second upper angular baffles secured to said partition approximate to said distal end of said partition.

8. An assembly as set forth in claim 7 wherein said stationary baffles include first and second lower stationary baffles extending inwardly from said floor platform to a distal end and define a lower dissipation chamber therebetween.

9. An assembly as set forth in claim 8 wherein said angular baffles include first and second lower angular baffles secured to said partition approximate to said opposite distal end of said partition.

10. An assembly as set forth in claim 9 wherein said angular baffles are secured approximate to each of said distal ends of said partition for aligning said angular baffles with said stationary baffles when at said predetermined circumferential position of rotation of said discs.

11. An assembly as set forth in claim 10 wherein said angular baffles each include a deflecting surface and a channeling surface.

12. An assembly as set forth in claim 11 wherein said deflecting surfaces and said channeling surfaces of said angular baffles generally establish triangular baffle formations in relation to said partition.

13. An assembly as set forth in claim 12 wherein said channeling surfaces of said angular baffles include a channeling apex disposed at an intersection of said channeling surfaces and said opposite distal ends of said partition.

14. An assembly as set forth in claim 13 wherein said channeling surfaces each include a distal end intersecting said deflecting surfaces wherein said distal ends of said channeling surfaces extend inwardly from said opposite distal ends of said partition.

15. An assembly as set forth in claim 14 further including a receiving juncture established between said triangular baffle formations and said plurality of stationary baffles when at said predetermined circumferential position of rotation of said discs.

16. An assembly as set forth in claim 15 further including first and second workpiece mounting devices disposed between said first and second discs on the opposite sides of said partition.

17. An assembly as set forth in claim 16 wherein said first and second workpiece mounting devices include a generally horizontal rotational axis for rotatably manipulating the workpiece.

18. An assembly as set forth in claim 3 further including a deflection mechanism operating between said interior compartmental wall of said housing and said first and second discs for receiving and dissipating energy generated during the laser operations.

19. An assembly as set forth in claim 18 wherein said deflection mechanism includes a plurality of operational rings and a plurality of compartmental rings, said plurality of operational rings circumferentially encircling said first and second discs and said plurality of compartmental rings are fixably disposed in said interior compartmental wall of said housing.

20. An enclosure assembly for providing a safe operating environment during the manipulation of a workpiece, said assembly comprising:

a housing having a ceiling and a floor platform interconnected by opposing walls;

first and second discs rotatably supported by said opposing walls of said housing, said first and second discs being disposed in parallel and spaced relationship to one another;

at least one workpiece mounting device disposed between said first and second discs;

a partition having opposite distal ends, said partition extending between said discs and diametrically of said discs between said opposite distal ends to define an active chamber and a passive chamber within said housing on opposite sides of said partition;

a plurality of stationary baffles extending inwardly from said ceiling and from said floor platform; and a plurality of angular baffles secured to said partition and angularly extending from said partition toward said stationary baffles wherein said angular baffles and said stationary baffles form a laser dissipation reservoir at a predetermined circumferential position of rotation of said discs for receiving and dissipating energy generated during laser operations.

* * * * *